United States Patent
Traxler et al.

(10) Patent No.: US 9,686,176 B2
(45) Date of Patent: Jun. 20, 2017

(54) CONSTRAINED AND VIABLE PATH COMPUTATION SYSTEMS AND METHODS

(71) Applicants: Norman Steven Traxler, Ottawa (CA); David Jeffrey Miedema, Ottawa (CA); Sergio Slobodrian, Ottawa (CA); William Webb, Decatur, GA (US)

(72) Inventors: Norman Steven Traxler, Ottawa (CA); David Jeffrey Miedema, Ottawa (CA); Sergio Slobodrian, Ottawa (CA); William Webb, Decatur, GA (US)

(73) Assignee: Ciena Corporation, Hanover, MD (US)

(*) Notice: Subject to any disclaimer, the term of this patent is extended or adjusted under 35 U.S.C. 154(b) by 120 days.

(21) Appl. No.: 14/618,364

(22) Filed: Feb. 10, 2015

(65) Prior Publication Data
US 2016/0182355 A1    Jun. 23, 2016

Related U.S. Application Data

(60) Provisional application No. 62/094,621, filed on Dec. 19, 2014.

(51) Int. Cl.
*H04L 1/00* (2006.01)
*H04L 12/733* (2013.01)
(Continued)

(52) U.S. Cl.
CPC ............ *H04L 45/122* (2013.01); *H04L 45/02* (2013.01); *H04L 45/64* (2013.01); *H04L 41/14* (2013.01)

(58) Field of Classification Search
CPC ........ H04L 45/122; H04L 45/64; H04L 45/02
See application file for complete search history.

(56) References Cited

U.S. PATENT DOCUMENTS 7,301,911 B2 * 11/2007 Mack-Crane ............. H04J 3/14
                                                          370/254
7,590,067 B2     9/2009 Zhang et al.
(Continued)

FOREIGN PATENT DOCUMENTS

GB    WO 2016083836 A1 *  6/2016   ............. H04L 41/12
IT    WO 2011085823 A1 *  7/2011   ............. H04J 14/02

OTHER PUBLICATIONS

Ramon Casellas, Ricardo Martínez, Raül Muñoz, and Sebastian Gunreben Enhanced Backwards Recursive Path Computation for Multi-area Wavelength Switched Optical Networks Under Wavelength Continuity Constraint J. Opt. Commun. Netw. /vol. 1, No. 2/Jul. 2009).*

(Continued)

*Primary Examiner* — Bob Phunkulh
(74) *Attorney, Agent, or Firm* — Clements Bernard Walker PLLC; Christopher L. Bernard; Lawrence A. Baratta, Jr.

(57) ABSTRACT

Path calculation systems and methods for determining a path, based on constraints and rules, for a connection at one or more layers in a network, include determining a path exploration map of the network based on a multi-layer network model of the network defining external edges and intra-node paths, the path exploration map comprising every external port in the network that is reachable from a source port; and utilizing the path exploration map to determine a viable path, from a destination port to the source port, subject to the constraints and the rules and based on a cost.

19 Claims, 10 Drawing Sheets

(51) Int. Cl.
*H04L 12/751* (2013.01)
*H04L 12/715* (2013.01)
*H04L 12/24* (2006.01)

(56) References Cited

U.S. PATENT DOCUMENTS

| | | |
|---|---|---|
| 7,995,569 B2 | 8/2011 | Ashwood-Smith et al. |
| 8,364,036 B2 | 1/2013 | Boertjes et al. |
| 8,433,192 B2 | 4/2013 | Frankel et al. |
| 8,837,292 B2 | 9/2014 | Lu et al. |
| 2007/0076629 A1 | 4/2007 | Ashwood-Smith et al. |
| 2012/0307629 A1 | 12/2012 | Vasseur et al. |
| 2013/0070754 A1* | 3/2013 | Iovanna .......... H04L 45/00 370/351 |
| 2014/0156751 A1* | 6/2014 | Bardalai .......... H04L 45/22 709/204 |
| 2014/0169791 A1 | 6/2014 | Swinkels et al. |
| 2014/0307538 A1* | 10/2014 | Iovanna .......... H04L 45/64 370/218 |
| 2015/0110109 A1* | 4/2015 | Winter .......... H04L 45/72 370/392 |
| 2015/0200838 A1* | 7/2015 | Nadeau .......... H04L 45/124 398/58 |
| 2016/0149794 A1* | 5/2016 | Coles .......... H04L 45/64 370/389 |
| 2016/0173338 A1* | 6/2016 | Wolting .......... H04L 41/145 709/223 |

OTHER PUBLICATIONS

"Bellman—Ford algorithm," From Wikipedia, the free encyclopedia, pp. 1-6.
"Dijkstra's algorithm," From Wikipedia, the free encyclopedia, pp. 1-11.
"K shortest path routing," From Wikipedia, the free encyclopedia, pp. 1-4.

* cited by examiner

CONSTRAINED AND VIABLE PATH COMPUTATION SYSTEMS AND METHODS

CROSS-REFERENCE TO RELATED APPLICATION(S)

The present patent/patent application claims priority to U.S. Provisional Patent No. 62/094,621, filed Dec. 19, 2014, and entitled "CONSTRAINED AND VIABLE PATH COMPUTATION SYSTEMS AND METHODS," the contents of which are incorporated by reference herein.

FIELD OF THE DISCLOSURE

The present disclosure relates generally to networking systems and methods. More particularly, the present disclosure relates to constrained and viable path computation systems and methods.

BACKGROUND OF THE DISCLOSURE

In networks, path computation includes determining and finding a suitable path for a connection between a source and a destination, subject to one or more constraints. The connection can be a wavelength (Layer 0), Time Division Multiplexing (TDM) (Layer 1), Ethernet/Multiprotocol Label Switching (MPLS) (Layer 2), Internet Protocol (IP) (Layer 3), or a combination thereof. That is, the connection provides data connectivity in the network between the source and destination. The connection can be viewed as a single layer connection, e.g., a packet connection at Layer 2, an OTN connection at Layer 1, a wavelength at Layer 0, etc. Alternatively, the connection can be viewed as spanning multiple Layers, e.g., an OTN connection on a wavelength. In the past, these multiple Layers (Layer 0, 1, 2, and/or 3) were managed independently including path computation. However, networks are evolving to support the management and control of multiple layers (Layer 0, 1, 2, and/or 3) using control planes, Software Defined Networking (SDN), and the like in a single management plane. Disadvantageously, conventional path computation techniques lack support for multiple layer technology path computation. Specifically, next-generation networks expect that connections can be managed, on-demand with abstraction of the underlying layers and hardware using SDN, Network Functions Virtualization (NFV), control planes, etc. Thus, there is a need for path computation techniques operating a multi-layer path calculation.

Three exemplary conventional path computation techniques are Dijkstra's shortest path algorithm, K shortest path algorithm, and the Bellman-Ford algorithm. Again, each of these conventional path computation techniques does not support multi-layer path calculation. Also, these conventional path computation techniques assume every hop or link is ultimately valid, e.g., a certain hop from port X to port Y is possible as a path is explored, but this same hop may not be valid when considered as a part of an end-to-end path, as the hop may to not be acceptable in order to satisfy some constraints or rules. As described herein, the rules are technical limitations, e.g., an end-to-end path may only have some many hops due to optical reach, etc. Constraints are policy or business limitations, e.g., an end-to-end path must have a maximum latency, etc. The conventional path computation techniques are further limited in defining constraints or rules; that is, these techniques work if all constraints or rules can be expressed in terms of a single "cost" factor at each hop. These techniques do not allow more complex constraints or rules, such as multi-hop constraints or rules.

Additionally, K shortest path algorithms do not work in cases where the constraints or rules are more complex in nature. The "K"-value (K is number of shortest paths that should be considered) has to be increased to a higher value in order to find a viable path that meets the constraints or rules. A suitable K value for the given endpoints, constraints or rules cannot be determined ahead of time, resulting in the need to re-run path calculation with higher K values to find an appropriate path.

BRIEF SUMMARY OF THE DISCLOSURE

In an exemplary embodiment, a path calculation method for determining a path is described, based on constraints and rules, for a connection through one or more layers in a network. The path calculation method includes determining a path exploration map of the network based on a multi-layer network model of the network defining external edges and intra-node paths, the path exploration map comprising every external port in the network that is reachable from a source port; and utilizing the path exploration map to determine a viable path, from a destination port to the source port, subject to the constraints and the rules and based on a cost. The path exploration map can include paths to every external port from the source port, in both transmit and receive directions, and the utilizing the path exploration map can recursively build the viable path, by following the path exploration map from the destination port to the source port. The determining the path exploration map can proceed from the source port to the destination port and the utilizing the path exploration map can proceed from the destination port to the source port. Partial paths can be explored in the utilizing the path exploration map and included or excluded based on the constraints and the rules. The external edges can be between the external ports, and the intra-node paths can be between ports within a same node. The intra-node paths can be either forwarding edges at a same Layer or transformation edges between Layers. The constraints and/or the rules are evaluated in the utilizing the path exploration map over one or more hops, concurrently while determining the viable path. The multi-layer network model can consider any of Layer 0, 1, 2, and/or 3 in a same graph. The performing step and the determining step can be performed by a Software Defined Networking controller.

In another exemplary embodiment, a controller is described configured to determine a path in a network, based on constraints and rules, for a connection at one or more layers. The controller includes a processor; and memory storing instructions that, when executed, cause the processor to determine a path exploration map of the network based on a multi-layer network model of the network defining external edges and intra-node paths, the path exploration map comprising every external port in the network that is reachable from a source port, and utilize the path exploration map to determine a viable path, from a destination port to the source port, subject to the constraints and the rules and based on a cost. The path exploration map can include paths to every external port from the source port, in both transmit and receive directions, and the path exploration map can be utilized to recursively build the viable path, by following the path exploration map from the destination port to the source port. The path exploration map can be determined from the source port to the destination port and the path exploration map can be utilized from the destination port to the source port to determine the viable path. Partial paths can be explored in the path exploration map and included or excluded based on the constraints and the rules. The external edges can be between the external ports and the intra-node paths can be between ports within a same node. The intra-node paths can be either forwarding edges at a same Layer or transformation edges between Layers. The constraints and/or the rules can be evaluated in the path exploration map over one or more hops, concurrently while determining the viable path. The multi-layer network model can consider any of Layer 0, 1, 2, and/or 3 in a same graph. The controller can be a Software Defined Networking controller.

In a further exemplary embodiment, a node is described configured to determine a path in a network, based on constraints and rules, for a connection at one or more layers. The node includes a plurality of ports configured to communicate with other ports to form external edges; a switch system between the plurality of ports configured to form forwarding edges and transformation edges between the plurality of ports; and a controller communicatively coupled to the plurality of ports and the switch, the controller is configured to determine a path exploration map of the network based on a multi-layer network model of the network defining the external edges and intra-node paths, the path exploration map comprising every external port in the network that is reachable from a source port, and utilize the path exploration map to determine a viable path, from a destination port to the source port, subject to the constraints and the rules and based on a cost. The path exploration map can include paths to every external port from the source port, in both transmit and receive directions, and wherein the path exploration map can be utilized to recursively build the viable path, by following the path exploration map from the destination port to the source port.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, constrained and viable path computation systems and methods are described. The systems and methods support multi-layer technology path calculations for a network (e.g., wavelength (Layer 0), Time Division Multiplexing (TDM) (Layer 1), Ethernet/Multiprotocol Label Switching (MPLS) (Layer 2), Internet Protocol (IP) (Layer 3), etc.). Unlike conventional path computation techniques (Dijkstra, Bellman-Ford, K shortest path algorithms, etc.), the systems and methods do not make the assumption that every hop is ultimately valid. That is, a certain hop from port X to port Y is possible as the path is explored, but this same hop may not be valid when considering it a part of an end-to-end path, as the hop may not be acceptable in order to satisfy constraints or rules (technical or business). Conventional path calculations systems and methods work if all constraints can be expressed in terms of a single "cost" factor at each hop, whereas in the systems and methods described herein, more complex (multi-hop) constraints and/or rules can be used for the calculation of a valid end-to-end path.

Path calculation or computation is the heart of any system that looks to leverage the full capability of multi-layer networks, particularly in an SDN environment. A true multi-layer Path Computation Element (PCE), using the systems and methods described herein, that operates in a real-time environment provides the following values:

Path computation considers all layers of the network together, resulting in highly-granular, customized services;

An ability to calculate paths that that satisfy given rules (e.g., reach, etc.) and/or constraints (e.g., maximum latency, etc.) of each layer;

An ability to leverage a multi-layer, constrained path calculation to provide network optimization and protection path applications;

An output of the path calculation that provides valid, installable path, eliminating(s)g a need for post-processing to eliminate invalid, unviable or un-"rule"-y paths; and An ability to integrate with next-generation SDN controllers, management planes, and/or control planes.

Exemplary Network

Figure 1:
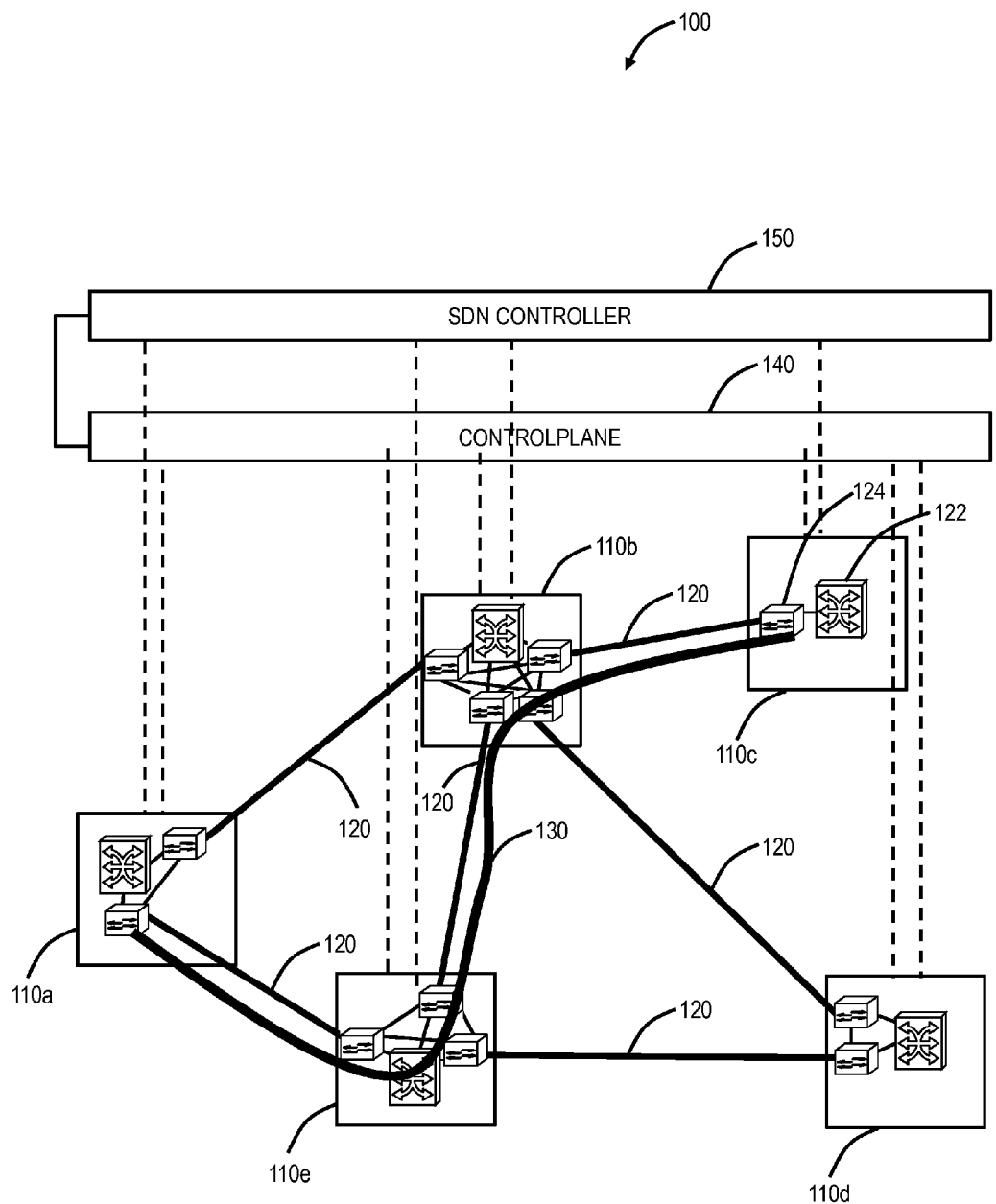
FIG. 1 is a network diagram of an exemplary network with five interconnected sites.

Referring to FIG. 1, in an exemplary embodiment, a network diagram illustrates an exemplary network 100 with five interconnected sites 110a, 110b, 110c, 110d, 110e. The sites 110 are interconnected through a plurality of links 120. Each of the sites 110 can include a switch 122 and one or more WDM network elements 124. The switch 122 is configured to provide services at Layers 1 (e.g., OTN/SONET/SDH) and/or Layer 2 (e.g., Ethernet, MPLS, etc.). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in a same network element or hardware. The photonic layer can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with less sites, with additional network elements and hardware, etc. The network 100 is presented herein as an exemplary embodiment for the constrained and viable path computation systems and methods.

The sites 110 communicate with one another optically over the links 120. The sites 110 can be network elements which include a plurality of ingress and egress ports forming the links 120. Further, the nodes 110 can include various degrees, i.e. the site 110c is a one degree node, the sites 110a, 110d are two degree nodes, the site 110e is a three degree node, and the site 110b is a four degree node. The number of degrees is indicative of the number of adjacent nodes at each particular node, i.e., the connectivity of a site to the network 100. The network 100 is illustrated with a connection 130 between the sites 110a, 110c and through the sites 110b, 110e. The connection 130 can be a subnetwork connection (SNC), label switched path (LSP), or any other end-to-end connection that can utilize the constrained and viable path computation systems and methods. Further, the connection 130 can include various different aspects such as a wavelength, TDM traffic, packet traffic, and a combination thereof. For example, the connection 130 can be a wavelength. In another example, the connection 130 can be a 100 Gigabit Ethernet service operating in an Optical channel Data Unit-4 (ODU4) carried on a wavelength. Various other options are also contemplated. Additionally, the network 100 can include other components forming L2 and/or L3 connections in the network 100 such as routers, switches, packet-optical transport systems, and the like. Also, the switch 122 can also support L2 and/or L3 connections. The network 100 can include Ethernet, Virtual Local Area Network (VLAN), Multilayer Protocol Switching (MPLS), Internet Protocol (IP), etc. connections as well as wavelengths and TDM connections. In an exemplary embodiment, the constrained and viable path computation systems and methods can operate at a single Layer (L0, L1, L2, or L3), and in another exemplary embodiment, the constrained and viable path computation systems and methods can operate simultaneously at multiple layers.

The network 100 can include a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100 and the control plane 140 can utilize any type control plane for controlling the switches 122 and establishing connections therebetween.

A path (e.g., SNC, LSP, etc.) is considered valid for connection setup based on the availability of the switch 122, the links 120, and sufficient bandwidth available on each, in addition to the various aspects described herein with respect to the constrained and viable path computation systems and methods. Photonic networks, i.e. Layer 0 and the wavelength interconnectivity of the WDM network elements 124, introduce additional complexity of successfully setting up a service up. The network 100 can include photonic control aspects which can be viewed as a control plane and/or control algorithm/loop for managing wavelengths from a physical perspective at Layer 0. In one aspect, the photonic control is configured to add/remove wavelengths from the links in a controlled manner to minimize impacts to existing, in-service wavelengths. For example, the photonic control can adjust modem launch powers, optical amplifier gain, variable optical attenuator (VOA) settings, wavelength selective switch (WSS) parameters, etc.

The network 100 can also include a Software Defined Networking (SDN) controller 150. In an exemplary embodiment, the SDN controller 150 and the control plane 140 can work together. In another exemplary embodiment, the SDN controller 150 can operate independently with or without the control plane 140. In a further exemplary embodiment, the SDN controller 150 may be omitted. SDN allows management of network services through abstraction of lower level functionality. This is done by decoupling the system that makes decisions about where traffic is sent (SDN control through the SDN controller 150) from the underlying systems that forward traffic to the selected destination (i.e., the physical equipment in the network 100). Work on SDN calls for the ability to centrally program provisioning of forwarding on the network 100 in order for more flexible and precise control over network resources to support new services. The SDN controller 150 is a processing device that has a global view of the network 100. Additionally, the SDN controller 150 can include or connect to SDN applications which can utilize the data from the SDN controller 150 for various purposes. In an exemplary embodiment, the SDN applications include constrained and viable path computation systems and methods which are described in detail herein.

Path Calculation Engine

Figure 2:
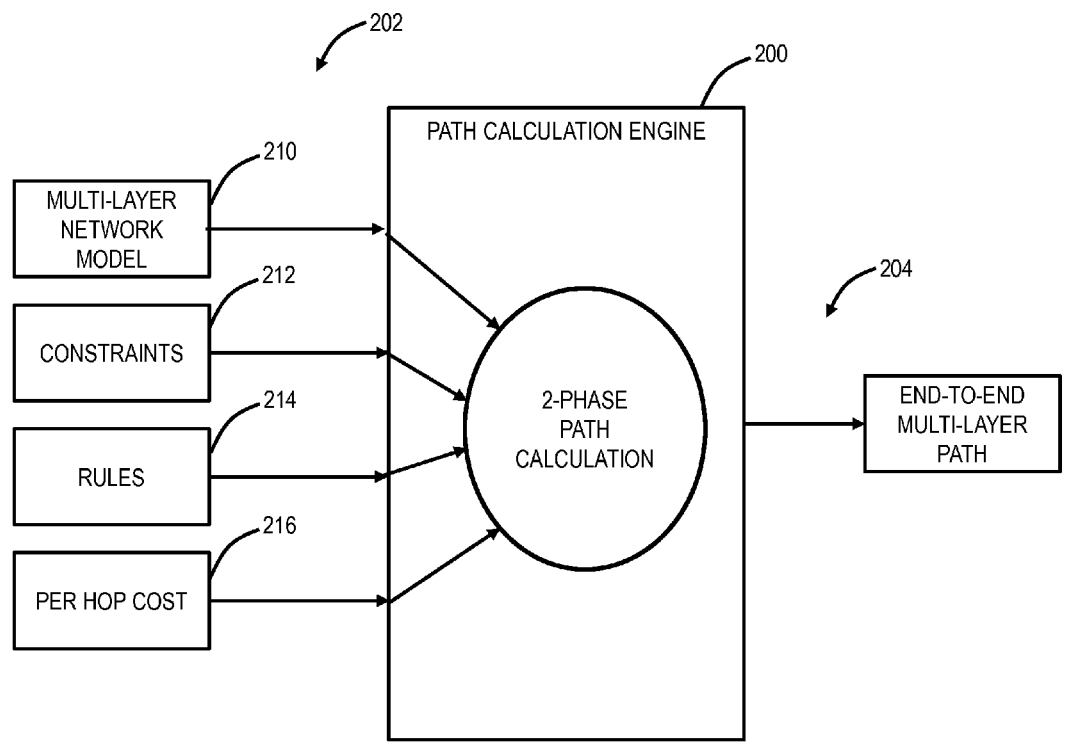
FIG. 2 is a block diagram of a path computation engine with associated inputs and output.

Referring to FIG. 2, in an exemplary embodiment, a block diagram illustrates a path computation engine 200 with associated inputs 202 and output 204. The path computation engine 200 includes the inputs 202 such as a multi-layer network model 210, constraints 212, rules 214, and per hop cost 216. The multi-layer network model 210 is an abstract model of the network 100 and is described in additional detail herein with respect to nodes, edges, and ports. The constraints 212 and the rules 214 both define characteristics for a desired path. In general, the constraints 212 are policy or business related, such as latency—a connection must have a maximum latency, and the like. The rules 214 are technical related, such as optical reach—a connection can only traverse X hops. The constraints 212 and the rules 214 are difficult to express as a single cost metric. For example, a constraint 212 could be prefer to multiplex a new path onto existing L0 lower-layer viable path rather than create a new L0 viable path, whereas a rule 214 can be that a L0 lower-layer path can only traverse X hops. Finally, the per hop cost 216 is the administrative weight for each of the links 120 in the network 100. Exemplary values for the per hop cost 216 can be one for each hop, a physical distance for each hop, or some other deterministic value. The inputs 202 are provided through a two-phase path calculation 220 to provide an A-Z path for a connection at one or more levels at the output 204.

The per hop cost 216 is used for lowest cost path computation. The constraints 212 and the rules 214 are used to exclude a particular hop, a series of hops, or overall paths. For example, one rule 214 can be optical reach and can be expressed as distance, attenuation, etc. One constraint 212 can be latency, and similar to reach, latency is objective and can be expressed as distance, etc. These are objective values that can be tested in the path computation engine 200 to exclude non-viable paths. The path computation engine 200 treats the constraints 212 and the rules 214 as true/false evaluations rather than cost factors. Also, the constraints 212 and the rules 214 can be evaluated over one or more hops. The constraints 212 and the rules 214 can be evaluated outside of the path computation engine 200, for example as call-out/call-back functions—one function for each of the constraints 212 and the rules 214, i.e. take a partial or full path and return a true or false to tell the path computation engine if the constraints 212 and the rules 214 is satisfied or not.

Network Model

Figure 3:
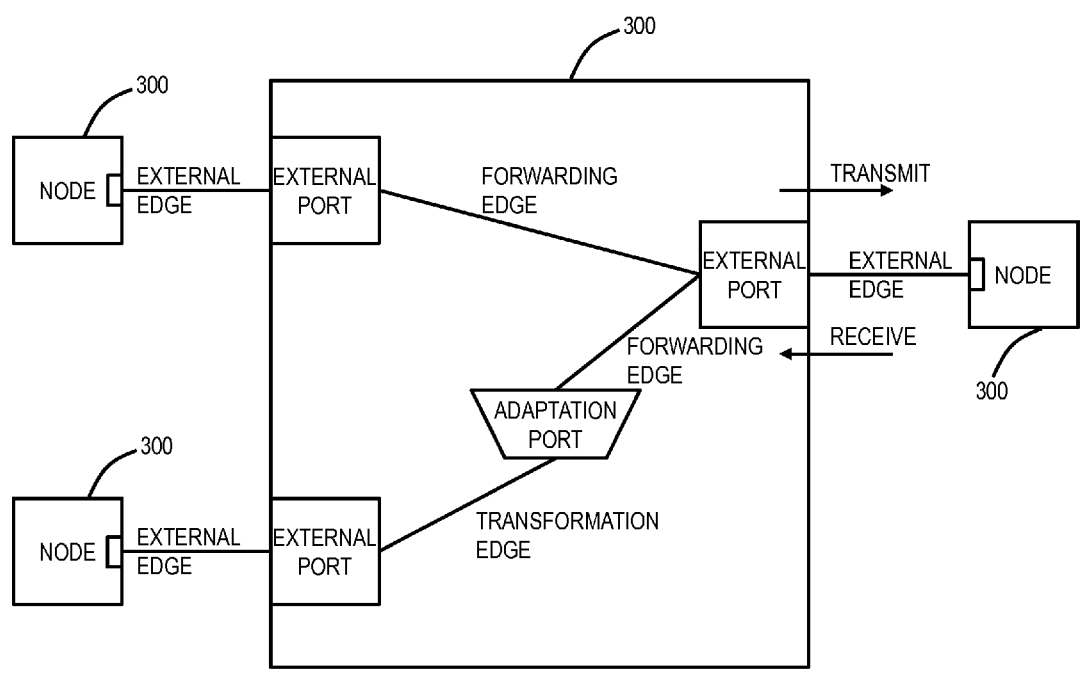
FIG. 3 is a block diagram of a node to describe the multi-layer network model of FIG. 2.

Referring to FIG. 3, in an exemplary embodiment, a logical block diagram illustrates a node 300 as part of the multi-layer network model 210. In general, the multi-layer network model 210 describes the network 100 or any other network in terms of nodes 300, edges, and ports, for use in the path computation engine 200. Each of the nodes 300 include ports that form edges to other nodes 300 or to other ports within the same node 300.

An edge indicates a relationship between ports (similar to an edge in a graph). In the network model 210, there are two major types of edges:

External edge: an edge between external ports on different nodes; and

Internal edge: an edge between ports on the same node. That is, the external edge is between nodes in the network, whereas the internal edge is within a same node. There are two sub-types of internal edges:

Internal forwarding edge: used to indicate signal forwarding at a single layer (e.g., L2 to L2 port, L1 to L1 connection, L0 to L0 wavelength, where L2 is Layer 2, L1 is Layer 1, and L0 is Layer 3). Here, the input and the output are at the same Layer.

Internal transformation edge: signal transform between layers (e.g., L2 to L1 port encapsulation, Link Aggregation Group (LAG), multiplexing/de-multiplexing function, etc.). Also known as "Transitional Link" in ITU-T G.8080. That is, the internal transformation edge is a transition between Layers. There are numerous examples, such as, mapping an OTN signal to a wavelength, mapping a packet connection to an OTN signal, etc.

An intra-node path is a sequence of one or more internal edges. A port is similar to a vertex in a graph. It represents the origination or termination point of zero or more edges. There are two types of ports:

External port: this is an outward facing termination point in a node. External or internal edges can originate or terminate at an external port. The external port is logically divided into a receive versus transmit direction. The receive direction of an external port is the outward facing side of the port which is the sink of an external edge. The transmit direction of an external port is the inward facing side of the port which is the sink of an intra-node path.

Adaptation Port: this is an inward facing termination point in a node. Only internal edges can originate or terminate at an adaptation port. External edges cannot originate or terminate at an adaptation port.

A node in the graph represents a networking device or network element that performs either a simple signal forwarding function (e.g., L2 switch) or a more complex multi-layer forwarding and transform function. Stated differently, the node can operate at a single Layer, e.g., a WDM switch (L0), an OTN switch (L1), a packet switch (L2), etc., or at multiple Layers, e.g., a Packet Optical Transport System (POTS), etc. The node contains a set of uniquely identified "ports" (similar to a vertex in the graph) which groups external ports and/or adaptation ports within the node.

Method for Path Calculation

Figure 4:
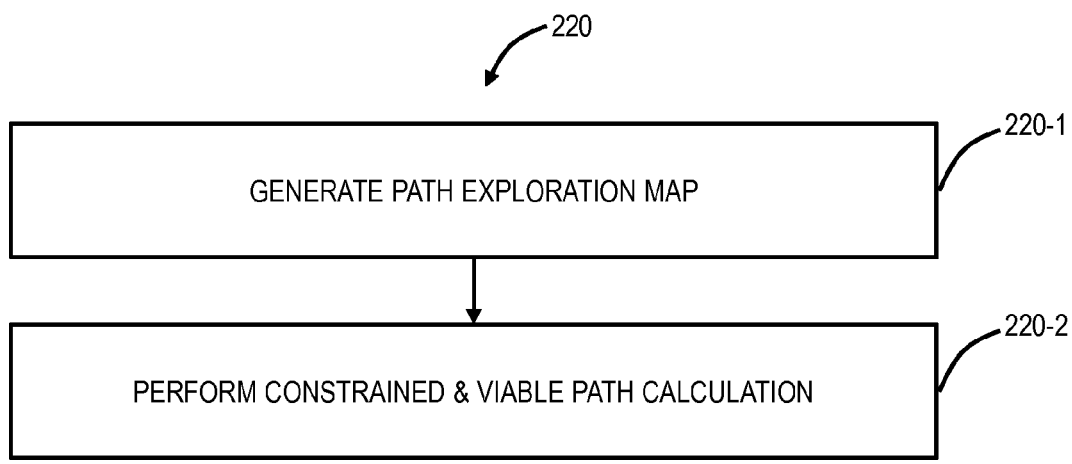
FIG. 4 is a flow chart of the two-phase path calculation of FIG. 2.

Referring to FIG. 4, in an exemplary embodiment, a flow chart illustrates the two-phase path calculation 220. The path calculation 220 includes generating a path exploration map (step 220-1) and performing a constrained and viable path calculation (step 220-2). Again, the two-phase path calculation 220 has two steps (i.e., phases, stages, etc.). The path exploration map (step 220-1) explores all edges (external, transform and forwarding) to build a path map of diverse paths to every port in the network, where the first path entry to any given node is the shortest path from the given source node. Transmit (TX) versus receive (RX) direction paths of each port are tracked separately in order to allow paths from either direction to pass through a given port (except for logical ports).

The constrained and viable path calculation (step 220-2) uses the results from the path exploration map (step 220-1) to calculate the best, next best, etc. path to the given destination node. The search can be restricted by the maximum number of hops, maximum number of alternative paths to each node to be explored, by constraints, rules, and the like. Note, the first path in the list at the destination node is automatically the shortest-hops path. For example, if k is set to 0, this is the path that will get returned, and the constrained and viable path calculation (step 220-2) calculation may be unnecessary. The second, third, etc. path at the destination node are potential protection paths. The constrained and viable path calculation (step 220-2) starts from the destination port, and recursively builds the path by following the first, second, etc. path to the next node in the list built during the path exploration map (step 220-1). Thus, the path exploration map includes paths to every external port from the source port, in both transmit and receive directions, from the step 220-1. The step 220-2 includes utilizing the path exploration map to recursively build the viable path, by following the path exploration map from the destination port to the source port. That is, the step 220-1 proceeds from the source port to the destination port and the step 220-2 proceeds from the destination port to the source port.

For the generation of the path exploration map (step 220-1), the following inputs are provided:

A source node+port. (client source port);

A destination node+port. (client destination port);

A data structure containing the external edges between the external ports; and

A data structure containing the intra-node paths (made up of one or more internal transformation and/or internal forwarding edges) originating from each external port. Intra-node paths cannot "pass-through" an external port. Put differently, an intra-node path can go directly from one external port to another, or pass through one or more adaptation ports.

In the step 220-1, the path calculation 220 explores all edges and intra-node paths, such as based on a Dijkstra shortest path or the like, to build a path exploration map for all external ports (or table, the key into the table being a port identifier+directionality) of diverse paths from the client source port to every external port in the network. As the network 100 is explored, the path calculation 220 includes recording, at the external port, all intra-node paths as the transmit direction and the external edge as the receive direction. No external edge shall be visited more than once in each direction during the exploration phase of the step 220-1.

The output of the step 220-1 is a data structure containing the receive and transmit information for every external port in the network that is reachable. Note, the first entry located at the client destination ports' transmit direction is what would have been the last hop result of a Dijkstra shortest path algorithm. The running time for the step 220-1 is O(n) worst case if all ports are connected with external edges— where n is the number of ports in the network 100.

For the constrained and viable path calculation (step 220-2), the following inputs are provided:

A source node+port. (client source port);
A destination node+port. (client destination port);
A data structure containing the external edges between the ports;
A data structure containing the intra-node paths (made up of one or more internal transformation and/or internal forwarding edges);
Path constraints (implemented by a rule engine); and
An output data structure from the step 220-1 containing the list of neighbor paths to each port.

The constrained and viable path calculation step 220-2 has the following definitions:

Path constraint: which is a constraint or rule engine that is specified as input to the path calculation. The path constraint is something which must be valid for the path, hop, or series of hops to be considered viable as a path;

Partial path: An incomplete path from the source port to destination port. The partial path always ends at the destination port, but may begin at any reachable port in the network; and Valid path: A partial or complete path is a valid path if a constraint and/or rule determined that the path is both viable and meets the path constraints.

The constrained and viable path calculation step 220-2 requires the following resources:

Primary queue: which is a sorted queue of all partial paths to be considered first in the path calculation. Paths of lower cost are further ahead of the queue than other partial paths;

Secondary queue: which is a priority-sorted queue of all partial paths to be considered in the path calculation, but are on hold at a node due to another "better" path in the working queue having already visited the node; and Visited nodes structure: records the nodes that have already been visited.

In the step 220-2, the path calculation 220 starts in reverse order (from the client destination port) to search backward each external port through the path map. It builds the path meeting the constraints at each port. Partial paths are created and if it's a valid path, fed to a priority queue. The priority queue is sorted by cost.

Paths are polled from the priority queue for further exploration. If the partial path polled from the queue has reached the client source port, the path is validated. If the path is valid, the path is returned as the result. If the path is not a valid path, the next path is polled from either the primary or secondary queue (if the primary queue is empty) and the visited nodes structure reset to the next path's visited nodes.

Partial paths, which are polled from the queue, are marked as having "visited" the previous node. This will result in new paths, to the node, not being added to the primary queue, but rather a secondary queue. The secondary queue is used later on in case the path, which marked the node as visited, turns out to be not a valid path.

Path Calculation Example

Figure 5:
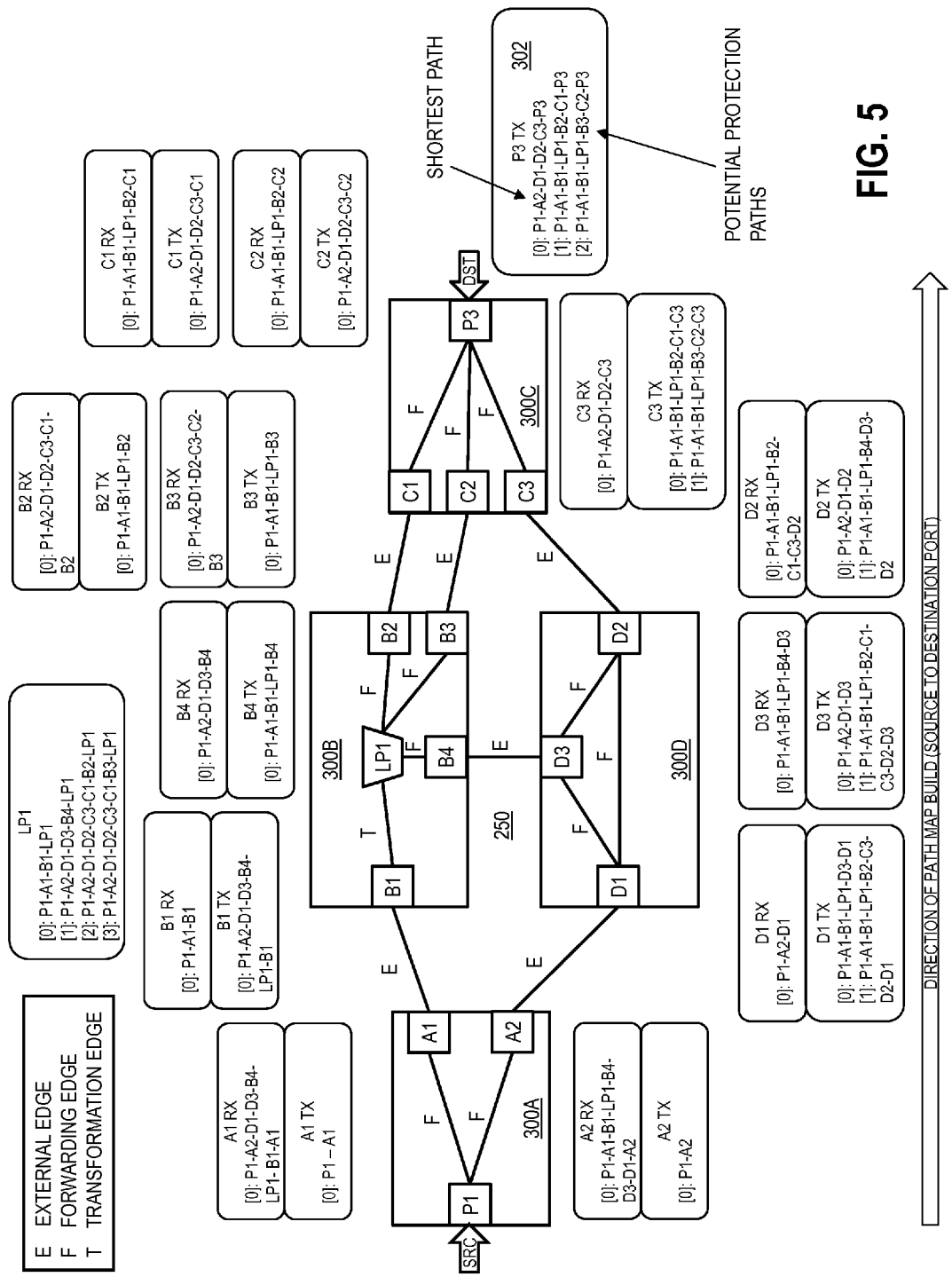
FIGS. 5 and 6 are network diagrams of an exemplary operation of the two-phase path calculation of FIG. 4.
Figure 6:
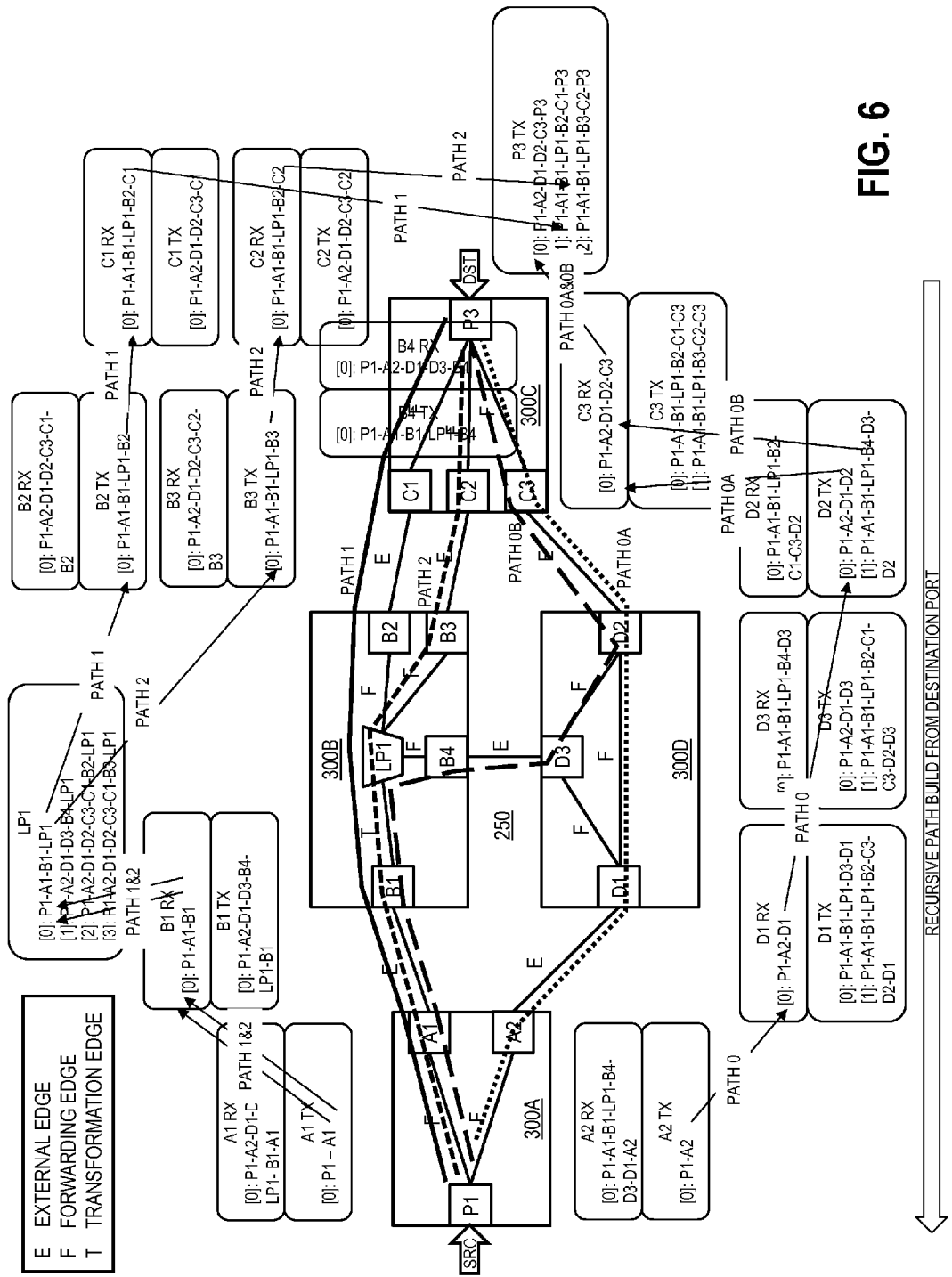

Referring to FIGS. 5 and 6, in an exemplary embodiment, network diagrams illustrate an exemplary operation of the two-phase path calculation 220 in a network 250 of nodes 300A, 300B, 300C, 300D. The network 250 includes four nodes 300A, 300B, 300C, 300D with various external edges E, internal forwarding edges F, and internal transformation edges T and various ports P1, A1, A2 on the node 300A, ports LP1, B1-B4 on the node 300B, ports P3, C1, C2, C3 on the node 300C, and ports D1, D2, D3 on the node 300D. In this example, the P1 is the client source port and the port P3 is the client destination port. FIG. 5 is an example of the path exploration map (step 220-1), and FIG. 6 is an example of the constrained and viable path calculation (step 220-2). In FIG. 5, the network 250 is illustrated with a path map, i.e. boxes showing the Dijkstra shortest path between the client source port and all ports in the network 250, in both a transmit (TX) and receive (RX) direction. At the port P3, results 302 are listed with a shortest path and potential additional paths. In FIG. 6, the results from FIG. 5 are used to calculate the best, next best, etc. path to the client destination port. Here, the constraints and viability of the paths are checked, in a recursive path build from the client destination port. Note, in FIGS. 5 and 6, the path exploration map shows full paths. In the subsequent example of FIG. 7, partial paths are shown for the path exploration map. Either embodiment is contemplated herein.

Figure 7:
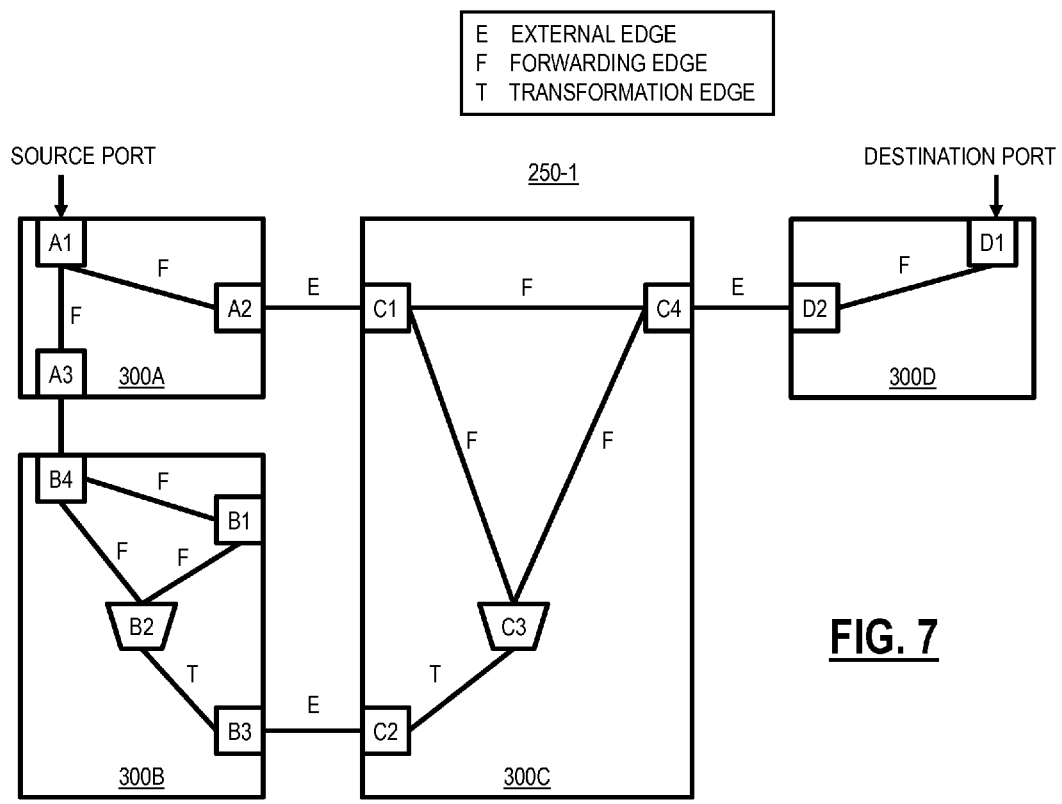
FIG. 7 is a network diagram of an example of the path exploration map step of FIG. 4.

Referring to FIG. 7 in an exemplary embodiment, a network diagram illustrates an example of the path exploration map step 220-1 in a network 250-1. The network 250-1 includes four nodes 300A, 300B, 300C, 300D with various external edges E, internal forwarding edges F, and internal transformation edges T and various ports A1-A3 on the node 300A, ports B1-B4 on the node 300B, ports C1-C4 on the node 300C, and ports D1-D2 on the node 300D. In this example, the port A1 is the client source port and the port D1 is the client destination port.

Again, the path exploration map step 220-1 includes building a map for all external ports of diverse paths from the client source port (here, port A1) to every external port in the network. In this example, the client source port is A1 and the external ports are A1, A2, A3, B1, B3, B4, C1, C2, C4, D1, D2. The map can be a table, the key into the table being a port identifier+directionality. The following table illustrates associated path exploration results with the minimum number of hops to reach the port shown in parenthesis:

| External Port | Transmit | Receive |
| --- | --- | --- |
| A1 | A3 - A1 (9) | None |
| A2 | A1 - A2 (1) | C1 - A2 (8) |
| A3 | A1 - A3 (1) | B4 - A3 (8) |
| C1 | C2 - C3 - C1 (7) | A2 - C1 (2) |
| C2 | C1 - C3 - C2 (4) | B3 - C2 (5) |
| C4 | C1 - C4 (3) & C2 - C3 - C4 (7) | None |
| D2 | None | C4 - D2 (4) |
| D1 | D2 - D1 (5) | None |
| B3 | B4 - B2 - B3 (4) | C2 - B3 (5) |
| B1 | B4 - B1 (3) & B3 - B2 - B1 (7) | None |
| B4 | B3 - B2 - B4 (7) | A3 - B4 (2) |

The above table is constructed using shortest path techniques and rules including no external edge can be visited more than once. In the above table, each external port is listed with an explored path to the external port from the client source port (here, port A1) in a transmit direction and a receive direction. Again, as the network is explored the table illustrates, at the external port, all intra-node paths as the transmit direction and the external edge as the receive direction. For example, to transmit to A1, from A1, the explored path is transmitting A3 to A1 and that takes 9 hops (A1-A2-C1-C3-C2-B3-B2-B4-A3-A1). To receive to A1, this is stated as none, meaning it is not reachable since A1 is the source port.

Method for Constrained and Viable Path Calculation

Figure 8:
FIG. 8 is a flow chart of an initialization sequence of the primary queue for the second phase of the two-phase path calculation in FIG. 4.

Referring to FIG. 8, in an exemplary embodiment, a flow chart illustrates an initialization sequence 410 of a primary queue 412. Here, the primary queue 412 is initialized with all nodal path entries for the client destination port transmit direction, and the secondary queue is initialized as empty.

Figure 9:
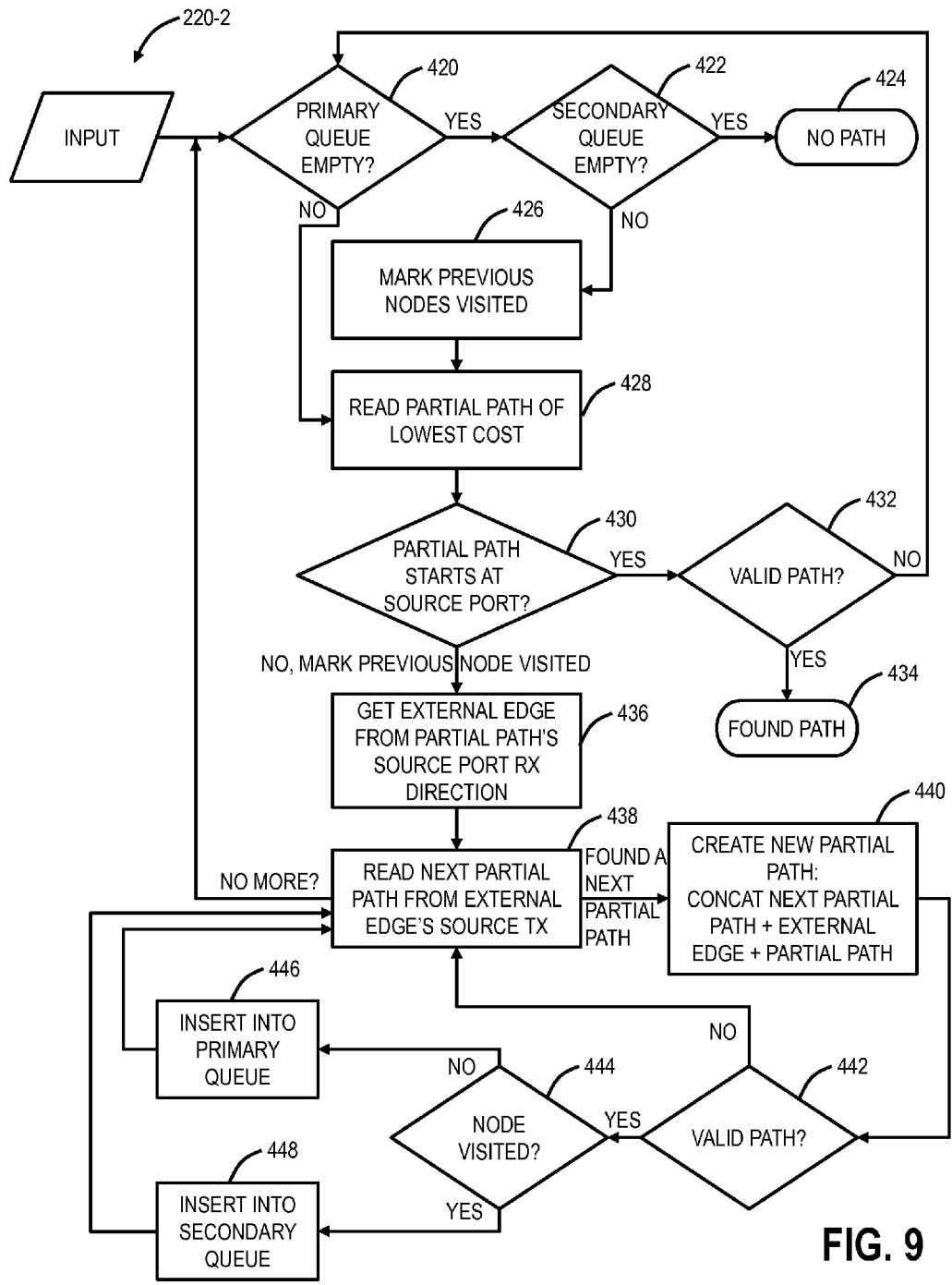
FIG. 9 is a flow chart of additional details of the constrained and viable path calculation step from FIG. 4 which evaluates the primary queue and the secondary queue to obtain a valid and constrained path.

Referring to FIG. 9, in an exemplary embodiment, a flow chart illustrates additional details of the constrained and viable path calculation step 220-2 which evaluates the primary queue and the secondary queue to obtain a valid and constrained path. If the primary queue (step 420) and the secondary queue (step 422) are empty, no path is returned (step 424). If the primary queue is empty (step 420), but the secondary queue is not empty (step 422), previously visited nodes are marked (step 426). If the primary queue is not empty (step 420) or after the previous visited nodes are marked (step 426), a partial path with the lowest cost is read from the queue (step 428). If the partial path starts at the client source port (step 430), it is checked if it is a valid path (step 432), and if not, the primary queue is checked again (step 420). If it is a valid path (step 432), the partial path is a found path (step 434), i.e. the lowest cost, valid and constrained path.

If the partial path does not start at the source port (step 430), the previous node is marked as visited and the external edge from the partial path's source port Rx direction is read (step 436). Next, the next partial path is read from the external edge's source TX (step 438) to find a next partial path. A new partial path is created as a concatenation of the next partial path, the external edge, and the partial path (step 440), and the new partial path is checked if it's a valid path (step 442). If not, the next partial path is read from the external edge's source TX (step 438). If the new partial path is a valid path (step 440), it is checked if the node has been visited (step 444). If the node has not been visited, the new partial path is inserted into the primary queue (step 446); otherwise the new partial path is inserted into the secondary queue (step 448). Next, the next partial path is read from the external edge's source TX (step 438) or if there are no more, the primary queue is checked (step 420).

The following pseudocode describes the constrained and viable path calculation step 220-2:

```
Initialize Primary Queue (PQ) with all nodal path entries for
the Client Destination Port Transmit Direction.
Initialize Secondary Queue (PQ) empty.
Visited Nodes = empty;
While (PQ not empty or SQ not empty) {
    If (PQ not empty) {
        currentPath = first from PQ;
    }
    else if (SQ not empty) {
        currentPath = first from SQ;
        visitedNodes = first from SQ visited Nodes;
    }
    if (source(currentPath) == Client Source Port) {
        if (valid(currentPath)) {
            return currentPath;
        } else {
            continue while loop;
```

-continued

```
        }
    }
    else {
        Mark previous Node of currentPath as Visited.
            nextExternalEdge = receive direction External
    Edge at currentPath's source Port.
            For each Transmit Path at nextEdge's srcNode {
                Partial path = Union of (internal Path +
    nextExternalEdge + currentPath) ;
                If (Partial Path is valid) {
                    If (visitedNodes contains internalPath's
    node) {
                        Insert Partial Path to SQ;
                    }
                    else {
                        Insert Partial Path to PQ;
                    }
                }
            }
        }
}
return no path;
```

Advantageously, the constrained and viable path computation systems and methods a) consider all layers of the network within the same graph; b) consider constraints and path rules (e.g., viability) while calculating the path; c) solve a computation-complex problem enabling support in a real-time SDN environment; d) use a 2-phase approach to path calculation: A-Z in phase 1, followed by Z-A backward path creation in Phase 2; and e) provide a single Network-wide Path Calculation Engine that covers any number of layers and variations of technologies (L3, L2, L1, L0).

SDN Controller/Server

Figure 10:
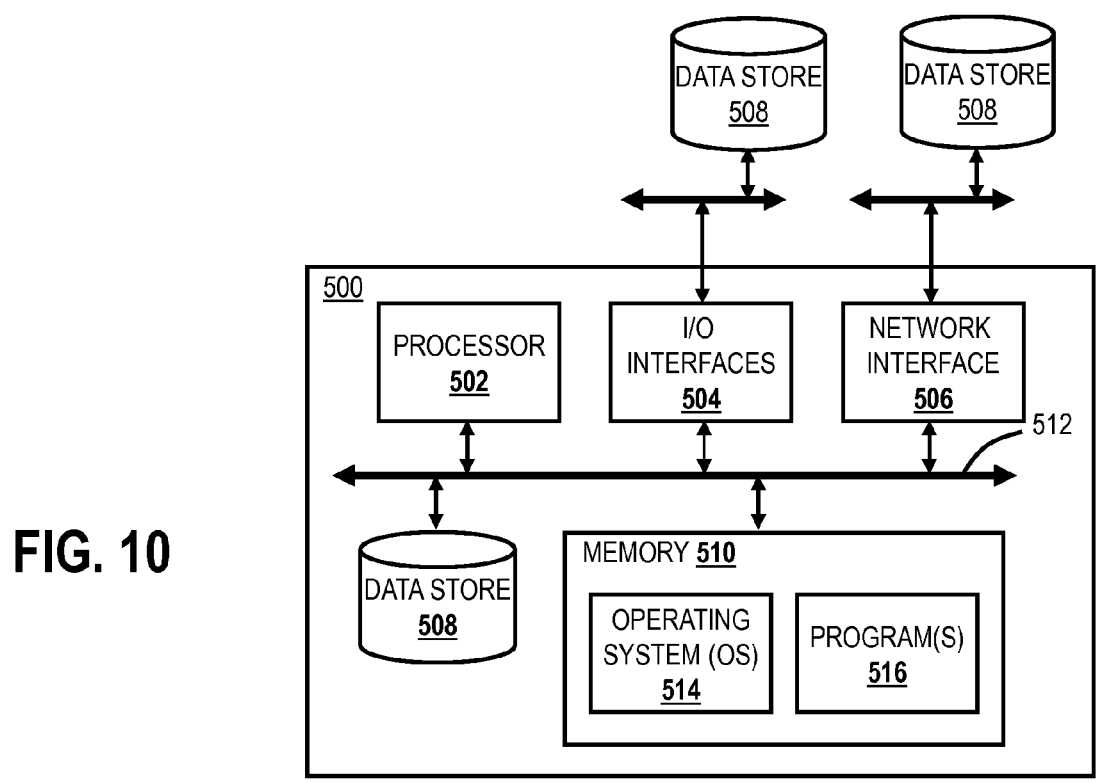
FIG. 10 is a block diagram of a server such as for the SDN controller, such as for implementing the path calculation.

Referring to FIG. 10, in an exemplary embodiment, a block diagram illustrates a server 500 such as for the SDN controller 150, such as for implementing the path calculation 220. The server 500 can be a digital computer that, in terms of hardware architecture, generally includes a processor 502, input/output (I/O) interfaces 504, a network interface 506, a data store 508, and memory 510. It should be appreciated by those of ordinary skill in the art that FIG. 10 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 can be, for example but not limited to, one or more buses or other wired or wireless connections, as is known in the art. The local interface 512 can have additional elements, which are omitted for simplicity, such as controllers, buffers (caches), drivers, repeaters, and receivers, among many others, to enable communications. Further, the local interface 512 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 can be used to receive user input from and/or for providing system output to one or more devices or components. User input can be provided via, for example, a keyboard, touch pad, and/or a mouse. System output can be provided via a display device and a printer (not shown). I/O interfaces 504 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 506 can be used to enable the server 500 to communicate on a network. The network interface 506 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 506 can include address, control, and/or data connections to enable appropriate communications on the network. A data store 508 can be used to store data. The data store 508 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be located internal to the server 500 such as, for example, an internal hard drive connected to the local interface 512 in the server 500. Additionally in another embodiment, the data store 508 can be located external to the server 500 such as, for example, an external hard drive connected to the I/O interfaces 504 (e.g., SCSI or USB connection). In a further embodiment, the data store 508 can be connected to the server 500 through a network, such as, for example, a network attached file server.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 can incorporate electronic, magnetic, optical, and/or other types of storage media. Note that the memory 510 can have a distributed architecture, where various components are situated remotely from one another, but can be accessed by the processor 502. The software in memory 510 can include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

In an exemplary embodiment, the SDN controller 150 can be implemented through the server 500 where the network interface 508 is communicatively coupled to one or more nodes in a network. The SDN controller 150 can also include an Application Programming Interface (API) which allows additional applications to interface with the SDN controller 150 for data associated with the network. In an exemplary embodiment, one or more applications can be implemented on the server 500 (or on the server 500 operating as the SDN controller 150) for the SDN control plane 200, and receive data through the API. Other configurations are also contemplated.

Exemplary Network Element/Node

Figure 11:
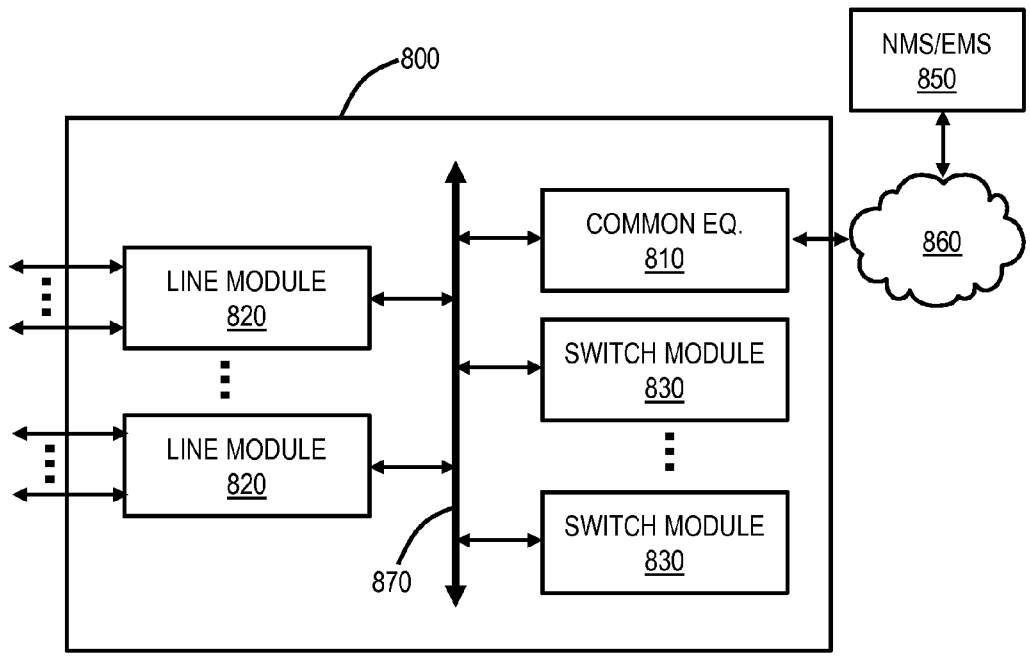
FIG. 11 is a block diagram of an exemplary node for use with the systems and methods described herein.

Referring to FIG. 11, in an exemplary embodiment, a block diagram illustrates an exemplary node 800 for use with the constrained and viable path computation systems and methods. In an exemplary embodiment, the exemplary node 800 can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM) platform, etc. into a single, high-capacity intelligent switching system providing Layer 0, 1, and/or 2 consolidation. In another exemplary embodiment, the node 800 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 800 can be any digital system with ingress and egress digital signals and switching therebetween of channels, timeslots, tributary units, wavelengths, etc. While the node 800 is generally shown as an optical network element, the systems and methods contemplated for use with any switching fabric, network element, or network based thereon.

Figure 12:
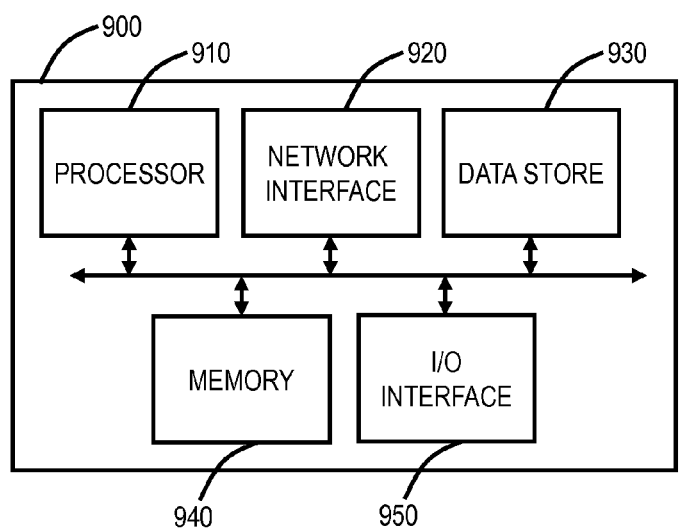
FIG. 12 is a block diagram of a controller to provide control plane processing and/or operations, administration, maintenance, and provisioning (OAM&P) for the node of FIG. 11.

In an exemplary embodiment, the node 800 includes common equipment 810, one or more line modules 820, and one or more switch modules 830. The common equipment 810 can include power; a control module; operations, administration, maintenance, and provisioning (OAM&P) access; user interface ports; and the like. The common equipment 810 can connect to a management system 850 through a data communication network 860 (as well as a Path Computation Element (PCE), the SDN controller 150, etc.). The management system 850 can include a network management system (NMS), element management system (EMS), or the like. Additionally, the common equipment 810 can include a control plane processor, such as a controller 900 illustrated in FIG. 12, configured to operate the control plane 140. The node 800 can include an interface 870 for communicatively coupling the common equipment 810, the line modules 820, and the switch modules 830 therebetween. For example, the interface 870 can be a backplane, midplane, a bus, optical or electrical connectors, or the like. The line modules 820 are configured to provide ingress and egress to the switch modules 830 and to external connections on the links to/from the node 800. In an exemplary embodiment, the line modules 820 can form ingress and egress switches with the switch modules 830 as center stage switches for a three-stage switch, e.g. a three stage Clos switch. Other configurations and/or architectures are also contemplated.

The line modules 820 can include optical transceivers such as with a plurality of optical connections per module and each module may include a flexible rate support for any type of connection, such as, for example, 155 MB/s, 622 MB/s, 1 GB/s, 2.5 GB/s, 10 GB/s, 40 GB/s, 100 GB/s, 100+GB/s, N×1.25 GB/s, and any rate in between. From a logical perspective, the line modules 820 provide ingress and egress ports to the node 800, and each line module 820 can include one or more physical ports. The switch modules 830 are configured to switch channels, timeslots, tributary units, packets, wavelengths, etc. between the line modules 820. Specifically, the switch modules 830 can include Time Division Multiplexed (TDM) (i.e., circuit switching) and/or packet switching engines. The switch modules 830 and/or the line modules 820 can form a switch system.

Those of ordinary skill in the art will recognize the node 800 can include other components which are omitted for illustration purposes, and that the systems and methods described herein are contemplated for use with a plurality of different network elements with the node 800 presented as an exemplary type of network element. For example, in another exemplary embodiment, the node 800 may not include the switch modules 830, but rather have the corresponding functionality in the line modules 820 (or some equivalent) in a distributed fashion. For the node 800, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 800 is merely presented as one exemplary node 800 for the systems and methods described herein.

With respect to the constrained and viable path computation systems and methods, the line modules 820 can form the ports and the external edges. The switch modules 820 can form the forwarding edges and the transformation edges. Specifically, the forwarding edges include switching, in the switch modules 820, at a same layer (e.g., TDM to TDM, packet to packet, wavelength to wavelength, etc.) while the transformation edges include mapping or converting layers (e.g., packet to TDM, TDM to wavelength, etc.). In this manner, a node 800 which supports multiple Layer operation, will include one or more transformation edges whereas a node 800 operating at a single layer will just have forwarding edges.

Exemplary Controller

Referring to FIG. 10, in an exemplary embodiment, a block diagram illustrates a controller 900 to provide control plane processing and/or operations, administration, maintenance, and provisioning (OAM&P) for the node 800. The controller 900 can be part of common equipment, such as common equipment 810 in the node 800, or a stand-alone device communicatively coupled to the node 800 via the DCN 860. The controller 900 can include a processor 910 which is hardware device for executing software instructions such as operating the control plane. The processor 910 can be any custom made or commercially available processor, a central processing unit (CPU), an auxiliary processor among several processors associated with the controller 900, a semiconductor-based microprocessor (in the form of a microchip or chip set), or generally any device for executing software instructions. When the controller 900 is in operation, the processor 910 is configured to execute software stored within memory, to communicate data to and from the memory, and to generally control operations of the controller 900 pursuant to the software instructions. The controller 900 can also include a network interface 920, a data store 930, memory 940, an I/O interface 950, and the like, all of which are communicatively coupled therebetween and with the processor 910.

The network interface 920 can be used to enable the controller 900 to communicate on the DCN 860, such as to communicate control plane information to other controllers, to the management system 850, and the like. The network interface 920 can include address, control, and/or data connections to enable appropriate communications on the network. The data store 930 can be used to store data, such as control plane information, provisioning data, OAM&P data, etc. The data store 930 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 930 can incorporate electronic, magnetic, optical, and/or other types of storage media. The memory 940 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 940 may incorporate electronic, magnetic, optical, and/or other types of storage media. Note that the memory 940 can have a distributed architecture, where various components are situated remotely from one another, but may be accessed by the processor 910. The I/O interface 950 includes components for the controller 900 to communicate to other devices.

In an exemplary embodiment, the controller 900 is configured to communicate with other controllers 900 in a network to operate a control plane for control plane signaling, perform OAM&P, etc. This communication may be either in-band or out-of-band. The controller 900 is configured to operate the control plane 140 in the network 100. That is, the controller 900 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 900 can include a topology database that maintains the current topology of the network 100 based on control plane signaling (e.g., HELLO messages) and a connection database that maintains available bandwidth on the links again based on the control plane signaling. In an exemplary embodiment, the controller 900 can be configured to implement part or all of the constrained and viable path computation systems and methods.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like.

When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A path calculation method for determining a path, based on constraints and rules, for a connection through one or more layers in a network, the path calculation method comprising:
   determining a path exploration map of the network based on a multi-layer network model of the network defining external edges and intra-node paths, the path exploration map comprising every external port in the network that is reachable from a source port;
   utilizing the path exploration map to determine a viable path, from a destination port to the source port at a plurality of layers, subject to the constraints and the rules and based on a cost and recursively building the viable path by following both the external edges and the intra-node paths through the plurality of layers from the destination port to the source port, wherein the plurality of layers are modeled in the path exploration map as the intra-node paths comprising one or more internal transformation edges which model a transition between layers of the plurality of layers and internal forwarding edges which model signal forwarding at same layers within a node; and
   causing creation of the viable path in the network.

2. The path calculation method of claim 1, wherein the path exploration map includes paths to every external port from the source port, in both transmit and receive directions.

3. The path calculation method of claim 1, wherein the determining the path exploration map proceeds from the source port to the destination port and the utilizing the path exploration map proceeds from the destination port to the source port.

4. The path calculation method of claim 1, wherein partial paths are explored in the utilizing the path exploration map and included or excluded based on the constraints and the rules.

5. The path calculation method of claim 1, wherein the external edges are between the external ports, and the intra-node paths are between ports within a same node.

6. The path calculation method of claim 1, wherein the constraints and/or the rules are evaluated in the utilizing the path exploration map over one or more hops, concurrently while determining the viable path.

7. The path calculation method of claim 1, wherein the multi-layer network model considers any of Layer 0, 1, 2, and/or 3 in a same graph.

8. The path calculation method of claim 1, wherein the performing step and the determining step are performed by a Software Defined Networking controller.

9. A controller configured to determine a path in a network, based on constraints and rules, for a connection at one or more layers, the controller comprising:
   a processor; and
   memory storing instructions that, when executed, cause the processor to
      determine a path exploration map of the network based on a multi-layer network model of the network defining external edges and intra-node paths, the path exploration map comprising every external port in the network that is reachable from a source port, and
      utilize the path exploration map to determine a viable path, from a destination port to the source port at a plurality of layers, subject to the constraints and the rules and based on a cost and recursively building the viable path by following both the external edges and the intra-node paths through the plurality of layers from the destination port to the source port, wherein the plurality of layers are modeled in the path exploration map as the intra-node paths comprising one or more internal transformation edges which model a transition between layers of the plurality of layers and internal forwarding edges which model signal forwarding at same layers within a node.

10. The controller of claim 9, wherein the path exploration map includes paths to every external port from the source port, in both transmit and receive directions.

11. The controller of claim 9, wherein the path exploration map is determined from the source port to the destination port and the path exploration map is utilized from the destination port to the source port to determine the viable path.

12. The controller of claim 9, wherein partial paths are explored in the path exploration map and included or excluded based on the constraints and the rules.

13. The controller of claim 9, wherein the external edges are between the external ports and the intra-node paths are between ports within a same node.

14. The controller of claim 13, wherein the intra-node paths are either forwarding edges at a same Layer or transformation edges between Layers.

15. The controller of claim 9, wherein the constraints and/or the rules are evaluated in the path exploration map over one or more hops, concurrently while determining the viable path.

16. The controller of claim 9, wherein the multi-layer network model considers any of Layer 0, 1, 2, and/or 3 in a same graph.

17. The controller of claim 9, wherein the controller is a Software Defined Networking controller.

18. A node configured to determine a path in a network, based on constraints and rules, for a connection at one or more layers, the node comprising:
   a plurality of ports configured to communicate with other ports to form external edges;
   a switch system between the plurality of ports configured to form forwarding edges and transformation edges between the plurality of ports; and
   a controller communicatively coupled to the plurality of ports and the switch, the controller is configured to
      determine a path exploration map of the network based on a multi-layer network model of the network defining the external edges and intra-node paths, the path exploration map comprising every external port in the network that is reachable from a source port, and
      utilize the path exploration map to determine a viable path, from a destination port to the source port at a plurality of layers, subject to the constraints and the rules and based on a cost and recursively building the viable path by following both the external edges and the intra-node paths through the plurality of layers from the destination port to the source port, wherein the plurality of layers are modeled in the path exploration map as the intra-node paths comprising one or more internal transformation edges which model a transition between layers of the plurality of layers and internal forwarding edges which model signal forwarding at same layers within a node.

19. The node of claim 18, wherein the path exploration map includes paths to every external port from the source port, in both transmit and receive directions.

\* \* \* \* \*